(12) United States Patent
Sorokin et al.

(10) Patent No.: US 7,106,776 B1
(45) Date of Patent: Sep. 12, 2006

(54) DISCHARGE-PUMPED "DRESSED-ATOM" COHERENT LIGHT AMPLIFIER AND GENERATORS

(76) Inventors: Peter P. Sorokin, 5 Ashwood Rd., South Salem, NY (US) 10590; James Glownia, 21 Camino Mariquita, Santa Fe, NM (US) 87508; Rodney T. Hodgson, 822 Pinesbridge Rd., Ossining, NY (US) 10562

( * ) Notice: Subject to any disclaimer, the term of this patent is extended or adjusted under 35 U.S.C. 154(b) by 366 days.

(21) Appl. No.: 10/633,355

(22) Filed: Aug. 1, 2003

(51) Int. Cl.
*H01S 3/14* (2006.01)
*H01S 3/223* (2006.01)

(52) U.S. Cl. .......................... 372/56; 372/39
(58) Field of Classification Search .............. 372/56
See application file for complete search history.

(56) References Cited

U.S. PATENT DOCUMENTS

| | | | | |
|---|---|---|---|---|
| 3,892,979 A | * | 7/1975 | Hodgson et al. | 359/327 |
| 4,348,599 A | * | 9/1982 | Pradere et al. | 359/327 |
| 5,017,806 A | * | 5/1991 | Edelstein et al. | 359/330 |
| 5,303,710 A | * | 4/1994 | Bashkansky et al. | 600/476 |

FOREIGN PATENT DOCUMENTS

JP 2000049409 * 2/2000

* cited by examiner

*Primary Examiner*—Armando Rodriguez
(74) *Attorney, Agent, or Firm*—Rodney T Hodgson

(57) ABSTRACT

A novel practicable type of gaseous optical gain medium for efficiently generating intense, highly monochromatic, continuous-wave (CW) or pulsed, coherent light beams is disclosed. Gain results from nonlinear optical pumping of a gas of Λ-type "three-level" atoms, coherently phased ("dressed") via application to the medium of two monochromatic laser beams tuned to the resonance frequencies $\omega_0$ and $\omega'_0$. Nonlinear optical pumping of the "dressed-atom" gas is accomplished through the combined action of two separate physical processes: (1) A low pressure gaseous discharge, occurring continuously within the vessel containing the gain medium, produces intense narrow-band fluorescence at $\omega_0$ and $\omega'_0$ through the process of electron impact excitation (EE). (2) Via a specific form of the nonlinear photonic process of stimulated hyper-Raman scattering (SHRS), photons comprised by the narrow-band fluorescence generated in (1) are efficiently converted to photons comprised by the propagating coherent light beams at $\omega_0$ and $\omega'_0$, thus effecting amplification of the latter.

19 Claims, 4 Drawing Sheets

DISCHARGE-PUMPED "DRESSED-ATOM" COHERENT LIGHT AMPLIFIER AND GENERATORS

FIELD OF THE INVENTION

The present invention relates to method and apparatus for efficiently producing intense, highly monochromatic, continuous-wave (CW) or pulsed, coherent radiation at potentially a multitude of fixed wavelengths, ranging from the near-infrared (NIR) to the vacuum-ultraviolet (VUV).

BACKGROUND OF THE INVENTION

Forty-three years have elapsed since T. H. Maiman reported the first successful operation of a laser (the pulsed ruby laser). During this long period of time, dozens of new types of lasers were subsequently discovered (e.g. pulsed and CW gas-discharge lasers, pulsed and CW optically-pumped solid-state and liquid-state lasers, semiconductor diode lasers, etc.) and were found to have technically sophisticated but vital uses in a wide variety of fields (e.g. in medicine, manufacturing, basic scientific research, communications, computers, consumer products, military devices, etc.). All of these lasers operate on the same basic principle outlined in three fundamental U.S. laser patents (U.S. Pat. No. 2,929,922 by C. H. Townes & A. L. Schawlow and U.S. Pat. Nos. 4,053,845 and 4,704,583 by G. Gould), namely, that laser emission results from stimulated emission occurring on an optical transition that is inverted, i.e. that has more active atoms (ions, molecules, etc.) in the upper level than in the lower one. However, beginning about the year 1976, scientists working in the field of quantum electronics began intensively investigating both theoretically and experimentally the striking properties of a gas of atoms (ions, molecules, etc.) simultaneously saturated on two electric-dipole-allowed transitions sharing a common level. It was discovered that all atoms in such a prepared system become coherently phased by the action of the two applied monochromatic resonant laser beams. It is now customary to refer to such atoms as being "dressed" by the photons of the two applied laser beams. Such a gas of coherently phased (i.e. "dressed") atoms displays a number of highly unusual properties, the most well known and remarkable constituting a condition of complete transparency at both applied monochromatic laser beam frequencies. This is the effect that is usually termed "Electromagnetically Induced Transparency (EIT)". The main thrust in a sizeable portion of the aforementioned "dressed atom" studies became to try to discover ways in which such systems could be utilized to generate coherent light beams without population inversions being present on the laser transitions. A number of interesting proposals for "lasers without inversion (LWI)" were made, and relevant experiments were conducted. Although successful CW LWI operation based upon dressed-atom gain media was technically achieved in a sparse handful of tour-de-force efforts—the most notable being those reported by Zibrov et al. in *Physical Review Letters* 75, 1499 (1995) and by Padmabandu et al. in *Physical Review Letters* 76, 2053 (1996)—no useful new laser sources resulted from this work. The wavelengths of the LWI output beams generated were ones that could all easily be obtained with the use of standard commercial lasers. In addition, the LWI output beam powers were very much lower than those of the auxiliary CW lasers that were required to pump the LWI devices. It is therefore small wonder that today one can find practically no mention of CW LWI sources in trade magazines (e.g. *Laser Focus World*) for the photonics and optoelectronics industries.

The fact that no practical lasers resulted from early intensive efforts to develop coherent light sources based upon dressed-atom gaseous media might relate in part to the somewhat restrictive pumping schemes that were employed to excite the coherently phased atoms in these LWIs. However, clear demonstrations of the considerable advantages dressed-atom media can offer for coherent light generation were shown in two later experimental studies (Merriam et al., *IEEE Journal of Selected Topics in Quantum Electronics* 5, 1502 (1999); Merriam et al., *Physical Review Letters* 84, 5308 (2000)). In each of these experiments almost complete conversion of pulses of ultraviolet laser light into pulses of vacuum ultraviolet (VUV) coherent light was achieved through resonant nonlinear mixing occurring in a gas of coherently phased lead (Pb) atoms. Although these two studies involved only pulsed coherent light beams, they vividly demonstrated that significant extensions in the wavelength ranges of coherent light sources can be efficiently attained via nonlinear mixing of resonantly-tuned laser beams applied to dressed-atom gaseous media.

As has here been implied, the laser field is by now very mature. However, it still abounds with interesting ideas for new lasers which might prove to be of great utility if they could in fact be realized. One of these ideas centers on a laser that would utilize the fundamental resonance transitions on which intense narrow-band light is emitted in commercial low-pressure gas-discharge lamps, e.g. Na vapor street lamps that emit mostly on the "D" lines at 5890 Å and 5896 Å or Hg vapor fluorescent bulbs that emit primary radiation largely at 1849.5 Å and 2536.6 Å. The signature feature of such lamps is the high efficiency with which the narrow-band light is produced. However, as yet no way has been found to tap this efficient source of narrow-band light to make a practicable laser. The main obstacle here has always been that the lower states of the resonance transitions are the ground states of the light-emitting atoms or ions. Hence the gas in such lamps is always very strongly absorbing at the wavelengths of the emitted resonance fluorescence, even when the lamps are turned on. In addition, it would be extremely difficult to maintain population inversions on such resonance transitions.

In the present invention, both method and apparatus are provided by which major deficiencies which were present in both earlier mentioned CW LWI experimental demonstrations can be overcome. It is herein disclosed how both CW and pulsed coherent light beams can be efficiently generated through the use of a novel dressed-atom-gas pumping scheme, with power for the pumping scheme being entirely provided by a simple continuously operating gaseous electrical discharge. In the disclosed invention there is no intrinsic need for additional lasers to supply pump power, as was required in the above mentioned early LWI efforts. It is, therefore, a main object of the present invention to disclose a new type of gaseous optical gain medium which can provide the basis for a family of useful and practicable coherent light amplifiers and oscillators that operate without population inversions being present on any optical transitions of the atoms, ions, or molecules comprised by the medium. It is another object of the present invention to disclose a new type of gaseous optical gain medium in which amplification results from a novel pumping scheme involving nonlinear excitation of a dressed-atom gas, with the actual power used in pumping not having to be supplied by any auxiliary laser beams applied to the medium. It is a further object of the present invention to provide both method and apparatus for a useful and practicable gas phase device that efficiently generates coherent light on certain resonance line transitions at which light is efficiently produced in low-pressure fluorescent lamps. It will be apparent from a reading of this description how the invention achieves these and other objects, which objects will become apparent as this description proceeds.

SUMMARY OF THE INVENTION

One can easily distinguish both method and apparatus of the present invention from method and apparatus employed in each of the four successful coherent light generation experiments involving dressed-atom gaseous media that were mentioned in the BACKGROUND OF THE INVENTION section of the present disclosure. The present section will be primarily devoted to highlighting these differences. In addition, it will be noted that there is an intrinsic property of the inversionless gain medium of the present invention that leads to a great reduction in complexity of apparatus required when amplifiers are cascaded together to form high power coherent-light-generating systems. Such a reduction of complexity cannot be achieved with amplifier chains comprising gain media based upon population inversions.

In both the disclosed invention and in all four of the above-mentioned experiments, coherent light is generated via some type of process which involves excitation of a dressed-atom gas. In Merriam et al. (1999) and in Merriam et al. (2000), the atoms of a gas are coherently phased (i.e. "dressed") in a transient manner by the passage of two simultaneously applied, co-propagating, resonantly tuned, pulsed laser beams (frequencies $\omega_a, \omega_b$). A third pulsed laser beam (frequency $\omega_c$) is also simultaneously applied, and a pulsed coherent light wave at a fourth frequency ($\omega_d = \omega_a - \omega_b + \omega_c$) is generated via resonant nonlinear mixing of the three input waves propagating together in the gas, with a large fraction of the photons in the beam at $\omega_c$ eventually becoming converted into photons of the beam at $\omega_d$. Since, in the present invention, coherent light generation does not result from nonlinear wave mixing, and since a continuously operating gaseous electrical discharge provides the pumping power, all major aspects of both method and apparatus are different from those applying in the experiments of Merriam et al. (1999) and Merriam et al. (2000).

The basic scheme by which excitation is provided to produce coherent light in the present invention is also completely different from those utilized in the experiments reported in Zibrov et al. (1995) and in Padmabandu et al. (1996). In both of these experiments, excitation was provided by two relatively strong CW laser beams that were continually applied to the gas. In the latter of these experiments, one of these beams (termed the "drive") was made to be extremely monochromatic and was tuned to the frequency $\omega'_0$ of one of the coupled three-level-atom transitions of the active species (Na). The phase of the other beam (termed the "pump") was first deliberately scrambled to make the light of the beam incoherent, and the center frequency of this spectrally broadened beam was then made to coincide with the frequency $\omega_0$ of the other coupled transition of the active atom species. A very monochromatic, but relatively low intensity, CW LWI output beam was then generated at $\omega_0$. In this experiment there was no inherent mechanism to replenish the power in either the "drive" or "pump" beams. A generally similar excitation scheme was used in the experiment of Zibrov et al. (1995), with again no means being provided to replenish "drive" or "pump" beam powers.

By contrast, excitation in the present invention results from the combined effect of two separate physical processes occurring within the apparatus comprised by the invention. (1) In the disclosed invention, narrow-band fluorescence centered at the bare-atom resonance frequencies $\omega_0$ and $\omega'_0$ is produced in a continuously operating gaseous electrical discharge via the process of electron impact excitation (EIE). (2) Within part of the region of the disclosed invention wherein the coherently phased atoms (ions, molecules) reside, the fluorescence generated via physical process (1) is efficiently converted into highly monochromatic coherent dressed-atom laser light via the nonlinear photonic process of stimulated hyper-Raman scattering (SHRS).

In the present invention, the presence of co-propagating, relatively intense, highly monochromatic, laser beams at both $\omega_0$ and $\omega'_0$ is required to coherently phase (i.e. to "dress") the active atoms in the gas. These beams accomplish two things which enable coherent light to be generated in the disclosed invention. Through EIT, they make the dressed-atom gas fully transparent at $\omega_0$ and $\omega'_0$. They also "target" $\omega_0$ and $\omega'_0$ to be the frequencies of the photons that are produced by the SHRS conversion process described in the previous paragraph. As will be shown by the calculations presented in the DETAILED DESCRIPTION OF THE INVENTION section, as the initially applied laser beams at $\omega_0$ and $\omega'_0$ propagate through the dressed-atom gas of the present invention, their intensities can easily be increased by 10 times or more via the disclosed two-step pumping mechanism. The fact that both input beams which are required to "dress" the atoms of the gas are very strongly amplified in the disclosed invention provides a solid basis for constructing a family of useful and practicable coherent light generating devices. As was indicated above, such a basis clearly did not exist in the early CW LWI experiments.

A flexible aspect of the invention being disclosed is the fact that it can be realized in either "amplifier" or "oscillator" configurations, as will be fully described in the DETAILED DESCRIPTION OF THE INVENTION section of the present disclosure. An important property of the gain medium of the disclosed invention allows large numbers of gain modules of this type to be cascaded together in series in order to obtain very high intensity output beams. By contrast, with conventional coherent-light-amplifying media (i.e. with gain media that require population inversions to be present on the active transitions), cascading together a large number of amplifiers invariably results in the occurrence of what is termed amplified spontaneous emission, a process which seriously depletes the total gain of the amplifier chain. With the present invention, no gain depletion occurs when amplifiers are cascaded because no gain effectively exists at any point in the medium until the light wave being amplified actually arrives at that point. In the case of conventional amplifying media, gain is always present, irrespective of whether or not the light wave being amplified is also present.

BRIEF DESCRIPTION OF THE DRAWINGS

The following detailed description of the invention refers to the drawings appended hereto in which.

DETAILED DESCRIPTION OF THE INVENTION

In the first part of this section of the present patent application, the basic physics that is involved in the operation of the disclosed gain medium will be highlighted. In the second part of the present section, various embodiments of the invention will be discussed.

The key aspect of the disclosed invention theoretically enabling it to provide outstanding laser performance is that its basic operating scheme utilizes to great advantage both the well known striking spectroscopic features of a dressed-atom gas and the intrinsic properties of a hitherto totally unexplored laser pumping mechanism, i.e. the two-step process involving EIE and SHRS that was very briefly introduced in the SUMMARY OF THE INVENTION section of the present application. In the paragraphs which follow, this statement will be explained in some detail.

Figure 1:
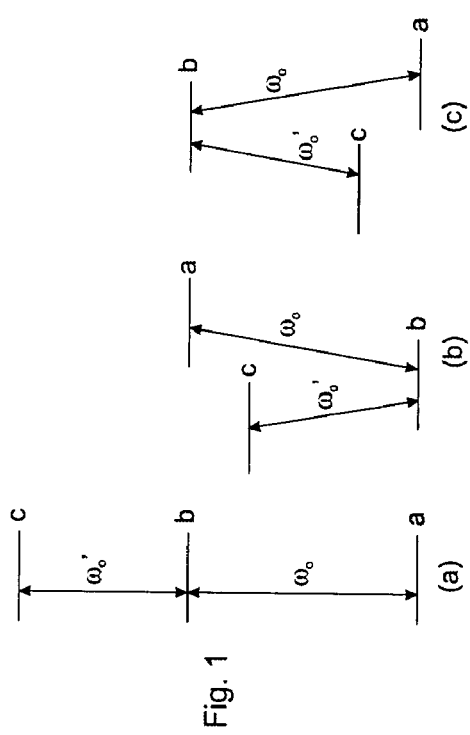
FIG. 1 shows energy level structures for (a) cascade-, (b) V-, and (c) Λ-type three-level atoms.
Figure 4:
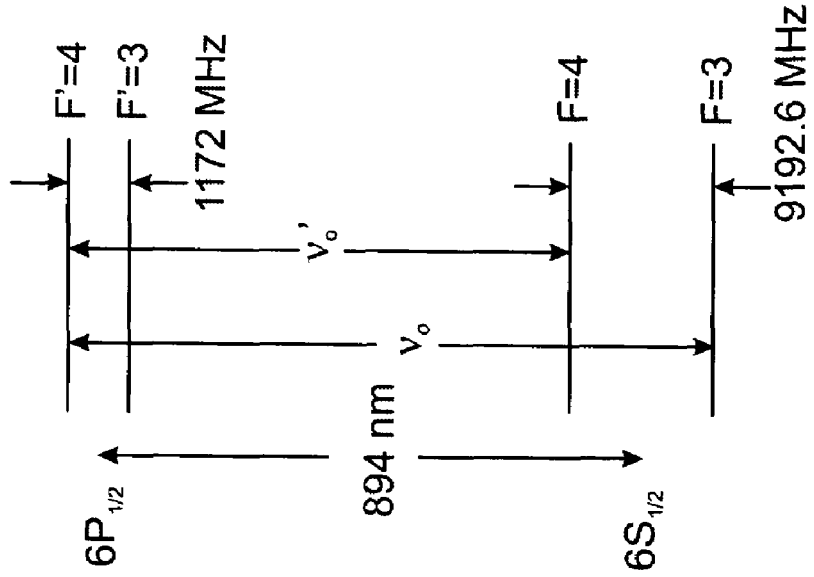
FIG. 4 is a schematic drawing of the energy levels involved in the $6S_{1/2} \leftrightarrow 6P_{1/2}$ transitions of atomic cesium (Cs). Arrows indicate a possible pair of transitions on which dressed-atom coherent light amplification could occur. Drawing is not to scale.

As already stated, a dressed-atom gas is a gas of three-level atoms (ions, molecules) which are coherently phased by the application of collinearly propagating, monochromatic, laser beams tuned to the "bare-atom" frequencies $\omega_0$ and $\omega'_0$. In FIG. 1 these frequencies are shown for the three possible types of three-level atom structures. In each of these types, the parities of two of the levels are the same, with the third being opposite. Two of the three transitions are thus dipole allowed; the third is dipole forbidden. It should be understood that the three levels of each structure shown in FIG. 1 represent the specific levels which are coupled together by the two applied laser beams. Any atom or ion species would have a multitude of additional energy levels which are not involved in dressed-atom laser emission, and these may lie above or below each of the three levels shown for each structure in FIG. 1. The presence of such a non-participating level can be seen in both FIG. 4 and FIG. 5, for example.

In order for the atoms in a gas to become coherently phased (i.e. "dressed"), a certain quantity, termed the "generalized Rabi frequency" $\Omega_1$, must have a value greater than the larger of either $\gamma$ or $\gamma'$, the fluorescence decay rates of the two bare-atom transitions ab and bc. The quantity $\Omega_1$ depends upon the individual Rabi frequencies of the applied lasers in the following way:

$$\Omega_1 = (\omega_1^2 + \omega_1'^2)^{\frac{1}{2}}, \qquad (1)$$

where $\omega_1$ and $\omega'_1$ are the Rabi frequencies of the applied laser beams at $\omega_0$ and $\omega'_0$, respectively. Each individual Rabi frequency is proportional to the square root of the corresponding laser beam intensity. From Eq. (1), it follows that the atoms of a gas could in principle still be "dressed", even if the intensity of one of the applied laser beams is vanishingly small.

Figure 2:
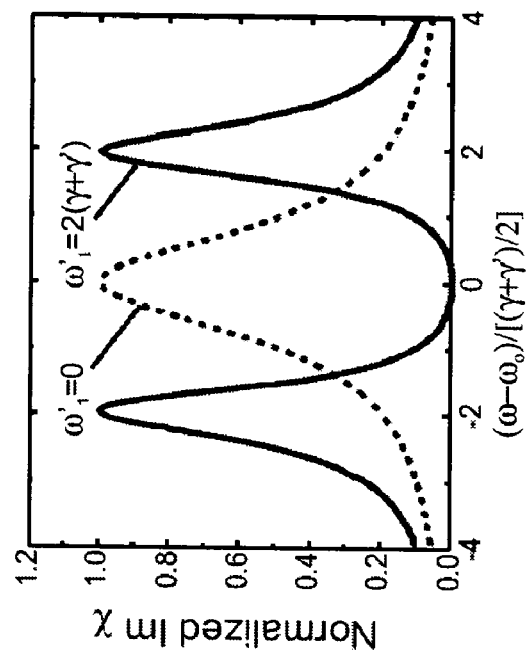
FIG. 2 (dashed curve) shows the normalized atomic absorption occurring about $\omega_0$ in a Λ-type gas with no external laser beams applied. The solid curve shows the calculated absorption (on the same scale) that would exist about $\omega_0$ when the same gas is irradiated by a laser beam at $\omega'_0$ having $\omega'_1=2(\gamma+\gamma')$. Figure adapted from FIG. 2 of Harris et al., *Physical Review Letters* 64, 1107 (1990).

The most striking spectroscopic property of a dressed-atom gas is the fact that it displays almost perfect transparency at the exact line centers of both bare-atom transitions ab and bc. This is the effect known in the LWI field as "Electromagnetically Induced Transparency" or EIT. In FIG. 2, the manner in which EIT occurs is illustrated. When a three-level, V- or $\Lambda$-type gas becomes "dressed", the normal atomic absorptions spectrally centered at $\omega_0$ and $\omega'_0$ evolve into absorption doublets, whose components are offset from the corresponding bare-atom frequencies by $\pm(\frac{1}{2})\Omega_1$, leaving prominent transparency regions centered at the bare-atom transition frequencies.

While the spectral widths of both transparency regions increase with increasing intensities of the applied laser beams, the maximum strengths of all the absorption bands bounding the transparency regions remain the same, i.e. "saturation" of the dressed-atom absorption spectrum does not occur. If only one resonant laser beam is applied, the non-saturating absorption doublet will only occur about the other bare-atom frequency. No linear absorption will be present in the vicinity of the frequency of the applied laser in this case. For a strongly irradiated dressed-atom gas to display intense non-saturating absorption doublets about both bare-atom frequencies, the intensities of the two applied laser beams must be roughly comparable.

In the disclosed invention, the two features of dressed-atom absorption bands outlined above are utilized in combination with the specified two-step pumping process to make dressed-atom-laser amplification or oscillation possible. The importance of EIT occurring at $\omega_0$ and $\omega'_0$ is easily understood. Since photons are directly "donated" to the two applied laser beams via the two-step pumping process, any absorption present at exactly $\omega_0$ and $\omega'_0$ would represent a severe propagation loss for the two beams that would have to be overcome by much additional optical gain.

The non-saturation feature of the dressed-atom absorption bands also plays a critical role in the disclosed invention. It prevents the efficiency of the SHRS process which converts incoherent pump light into dressed-atom laser light from saturating. That is, it allows the intrinsic conversion efficiency of the SHRS process to remain undiminished in value, even when very high intensity levels of dressed-atom laser light are present inside the region where amplification occurs.

Although, in principle, the active atoms in the disclosed invention could possess any of the three energy level structures shown in FIG. 1, it is specified in the present disclosure that the former must be of a species that can be made to work in a Λ-type scheme. The basis for this specification is the fact—well known to those who have worked in the LWI field—that while both cascade- and V-type dressed atoms strongly fluoresce, no such fluorescence occurs in the case of Λ-type dressed atoms. Since, in the disclosed invention, all atoms of the active species present in the paths of the propagating coherent light beams at $\omega_0$ and $\omega'_0$ must be coherently phased (i.e. "dressed") before the actual amplification process can begin, one would need prohibitively high intensities for the two input laser beams if the three coupled levels of the dressed atoms were to possess either a cascade- or a V-type structure.

Figure 3:
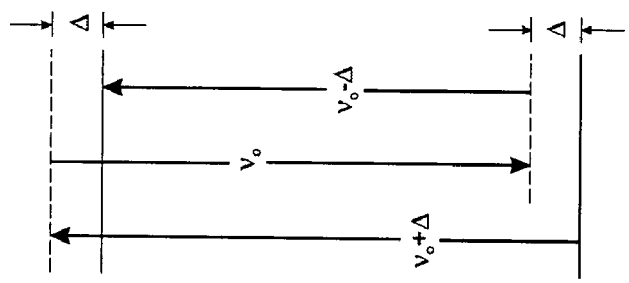
FIG. 3 is a diagram showing the unit energy-conserving, simultaneous, three-photon scattering event that becomes stimulated during the SHRS conversion process involved in the dressed-atom-laser pumping scheme embodying the disclosed invention. Here $v_0$ represents either of the bare-atom frequencies, with $\Delta$ being the frequency offset from $v_0$ of either of two pump photons that are simultaneously absorbed while a photon is "donated" to the laser beam at $v_0$. In the process, the atom becomes excited.

FIG. 3 is a schematic diagram of the three-photon, simultaneously occurring, energy conserving, scattering event representing the unit step in the SHRS process which in the disclosed invention directly converts photons of incoherent pump light (i.e. the narrow-band fluorescence spectrally distributed about $\omega_0$ and $\omega'_0$ that is generated by EIE in the gaseous electrical discharge of the disclosed invention) into dressed-atom laser photons. In FIG. 3, $v_0$ represents either of the bare-atom frequencies, with $\Delta$ being the frequency offset from $v_0$ of either of two pump light photons that are simultaneously absorbed while a photon is "donated" to the dressed-atom laser beam at $v_0$. In the process, the atom becomes excited and eventually fluoresces, in effect allowing a photon to be "recycled" back to the pump light "pool".

As its name implies, the SHRS pumping process embodied in the disclosed invention is a stimulated scattering process, meaning that the rate at which it occurs anywhere within the amplifying medium is proportional to (among other factors) the number density of the dressed-atom species, the square of the incoherent pump light intensity $I_p$ that isotropically irradiates the dressed atoms along the whole amplification path length, and the intensity per unit frequency interval (i.e. spectral intensity) of the dressed-atom laser beam at $v_0$ itself, with this last factor being the essential reason that SHRS converts fluorescence photons entirely into dressed-atom-laser photons.

To some extent one can describe the way that SHRS operates in the disclosed invention as being analogous to the way in which the much better known process of stimulated Raman scattering (SRS) occurs. For both stimulated scattering processes, no population inversions are required. In SRS, the scattering medium normally consists of "bare" atoms in their lowest energy level. In the form of SHRS utilized in the disclosed invention, the scattering medium consists of the coherently phased atoms of a "dressed-atom" gas. In SRS, transparency naturally exists for the coherent light that is generated, because the wavelengths of the latter are located in a spectral region of the scattering medium that is intrinsically free of absorption. In the form of SHRS utilized in the disclosed invention, transparency for the coherent light that is generated occurs solely as a result of EIT. Since SRS is a simultaneous two-photon process, both the transition rate and optical gain are linearly proportional to the pump light intensity. With SHRS being a simultaneous three-photon process, these same quantities are proportional to the square of the pump light intensity, as already noted above.

For both processes SRS and SHRS, formulas exist for calculating the optical gain when the pump light is itself a laser beam. (Two simultaneously applied laser beams having different frequencies are also sometimes used to excite SHRS.) A formula for the SHRS gain coefficient that applies when only one pump laser is used follows directly from Eq. (5.22) of the book by Hanna et al. (Hanna D. C., Yuratich M. A., & Cotter D. 1979, *Nonlinear Optics of Free Atoms and Molecules* (Springer-Verlag, Berlin, Heidelberg, and New York)) and takes the form:

$$G_{HR} = g_{HR} I_p^2 = \frac{n_a \omega_o I_p^2 \mu^6 / 4\varepsilon_o^3 c^3 \hbar^5 \Gamma}{\Delta^4}. \quad (2)$$

The hyper-Raman gain given in the above equation represents an exponential intensity gain per unit length, that is, in the absence of pump power depletion and/or saturation in the efficiency of the SHRS process itself, the intensity of the laser beam generated by this process would increase by a factor $e^{G_{HR} l}$ in traveling a distance $l$.

It is important here to restate emphatically that Eq. (2) is normally employed to calculate the hyper-Raman gain when the pump radiation is itself a monochromatic laser beam with frequency $v_L$ that is offset by $\pm\Delta$ from the frequency $v_0$ of an absorbing two-level gas. In such a case, the coherent light generated occurs at a frequency $v_L \pm \Delta$ and propagates in the same direction as the pump laser. For such a case, one can also draw a simultaneous three-photon transition diagram analogous to the one shown in FIG. 3. Thus the SHRS process embodied in the disclosed invention is seen to differ considerably from the usual SHRS scheme in that the former utilizes incoherent pump light applied in an isotropic manner along the whole amplification path length of the dressed-atom laser beam, whereas the latter incorporates end pumping by a beam of coherent light from a primary laser. Despite these large differences, the SHRS scheme embodied by the disclosed invention can successfully work, provided that the gain calculated through appropriate use of Eq. (2) is sufficiently large. It is thus important to make a rough estimate of this optical gain coefficient for at least one specific embodiment of the disclosed invention. The specific example of a Cs discharge-pumped dressed-atom gain medium will now be considered.

An excellent choice for the two lower levels of a Λ-type active species in the disclosed invention would be hyperfine levels belonging to the ground electronic state of an atom or ion. A select hyperfine level of an excited electronic state that has dipole-allowed transitions to both lower hyperfine levels could then be the upper level of the Λ-type structure. The energy differences between all ground state hyperfine levels are relatively small, so that the latter normally all have roughly equal thermal populations, even in the absence of any applied laser beams. One of the advantages of having ground state hyperfine levels serve as the lower levels in a Λ-type dressed-atom structure is that then $\omega_0 \approx \omega'_0$. Having almost equal bare-atom frequencies in a Λ-type scheme is one of the best ways to ensure that optimum transparency at $\omega_0$ and $\omega'_0$ occurs when the atoms are dressed. In the case of Cs, the most optimum Λ structure for a dressed-atom-laser medium would involve the levels shown in FIG. 4. This energy level structure will be assumed in the gain calculations which follow.

In FIG. 3, the quantity $\Delta$ represents the frequency offset from $v_0$ of both members of a pair of incoherent pump light photons participating in the simultaneous three-photon scattering process shown. In the disclosed invention, all processes similar to the one shown in FIG. 3 with absolute values of $\Delta$ ranging from near zero to the full Doppler width $\Delta v_D$ of the EIE-induced fluorescence bands at $\omega_0$ and $\omega'_0$ will contribute to the optical gain at $v_0$. Therefore, in order to calculate the SHRS optical gain in the case of the disclosed invention, one in principle should integrate the expression in Eq. (2) over the independent variable $\Delta$, taking the quantity $I_p$ to be a function of $\Delta$ that adequately represents the fluorescence lineshape. However, it is also sufficiently accurate—and much simpler—to avoid such integration altogether by substituting the value $(\frac{1}{2})\Delta\omega_D$ for the quantity $\Delta$ in Eq. (2), and assuming $I_p$ to be the total fluorescence band intensity. This procedure will be followed in the next paragraph.

In the numerical evaluation of SHRS gain via the use of Eq. (2), SI units will be employed. Thus $n_a=10^{21}$ m$^{-3}$ is a reasonable value for the Cs dressed-atom gas density in the disclosed invention, $\omega_0 \cong 2.1 \times 10^{15}$ radians/sec is the angular frequency of the Cs $6S_{1/2} \leftrightarrow 6P_{1/2}$ transition, $I_p \approx 10^2$ W/m$^2$ is a realistically attainable, conservative (vide infra) value for the fluorescence intensity in each hyperfine component of the λ8943.5 band existing everywhere along the length of the discharge in an optimized Cs lamp, $\mu \approx 5.05 \times 10^{-29}$ Cm is the Cs $6S_{1/2} \leftrightarrow 6P_{1/2}$ transition dipole moment (as obtained from Eq. (3) below), $\epsilon_0 = 8.85 \times 10^{-12}$ Fm$^{-1}$ is the permittivity of free space, $c = 3 \times 10^8$ m/sec is the velocity of light in vacuo, $\hbar = 1.05 \times 10^{-34}$ Jsec is the Dirac constant, $\Gamma \approx 6.28 \times 10^8$ rad/sec is the natural linewidth of the Cs $6S_{1/2} \leftrightarrow 6P_{1/2}$ transition expressed as an angular frequency, and $\Delta = (\frac{1}{2})\Delta\omega_D = 1.5 \times 10^9$ rad/sec is an appropriate average frequency offset to use in Eq. (2) in determining optical gain of the SHRS process in the disclosed invention, as was discussed earlier. The value for the Cs Doppler width ($\Delta v_D = 500$ MHz) here assumed corresponds to a temperature $T \approx 500$K, such temperature being more than sufficient to reach a vapor pressure corresponding to the value of $n_a$ assumed above. The value given above for the transition dipole moment $\mu$ follows from the standard equation:

$$\mu^2 = \frac{1}{\tau_{rad}} \frac{3\pi\epsilon_0 \hbar c^3 g_u}{\omega_0^3 g_l}, \quad (3)$$

with $\tau_{rad}$ being the radiative lifetime for the transition in question and $g_u$ and $g_l$ the upper and lower level degeneracies. For the Cs $6S_{1/2} \leftrightarrow 6P_{1/2}$ transition, the value here assumed for $\tau_{rad}$ is $10^{-8}$ sec. The upper and lower level degeneracies are both equal to 2.

Substitution of all the above values in Eq. (2) yields the result that $G_{HR} \approx 115$ m$^{-1}$. This enormous value for the calculated gain coefficient immediately implies that a conventional low-pressure Cs gaseous discharge occurring over the length of a meter or so should be a very effective nonlinear amplifier of two monochromatic CW laser beams tuned to a coupled pair of Cs $6S_{1/2} \leftrightarrow 6P_{1/2}$ hyperfine transition lines and applied as input to the discharge tube.

In the above estimation of parameter values that were utilized in Eq. (2) to determine the CW optical gain in a discharge-pumped Cs dressed-atom amplifier, it was noted that the value assumed for $I_p$ was a conservative one. The value that was chosen is indeed appropriate for CW amplification. However, when the applied laser beams at $\omega_0$ and $\omega'_0$ are pulsed, a much higher value should be assumed for the same quantity. This is because, in the absence of any propagating laser beams at $\omega_0$ and $\omega'_0$ very high densities of discharge-produced fluorescence photons at $\omega_0$ and $\omega'_0$ would normally exist throughout the gas-containing vessel, due to the fact that propagation of these photons in space is mediated by the occurrence of strong resonant elastic scattering by the active atoms of the gas.

The frequent elastic collisions that occur with atoms of the gas prevent the fluorescent photons continually being produced via EE from freely escaping from the gas-containing vessel, in effect "trapping" them within the latter at very high densities. In this way, the fluorescence radiation density is enhanced by many orders of magnitude over what it would be in the complete absence of elastic scattering. The latter density corresponds to the conservative value for $I_p$ that was assumed in the CW gain calculation presented earlier.

During pulsed operation, there is therefore inherent in the gain medium of the disclosed invention a mechanism allowing storage of pump energy to occur between pulses. When pulsed beams of monochromatic coherent radiation at $\omega_0$ and $\omega'_0$ are passed through the medium, all of this stored pump energy contained in the region of the gas-containing vessel traversed by the beams is converted by SHRS into photons in the two pulsed beams, making the latter orders-of-magnitude more energetic. A "dead time" period will then occur, as the population of fluorescence photons continually being produced in the discharge again builds up to its steady-state enhanced level. After this "dead time" period, pulsed monochromatic beams at $\omega_0$ and $\omega'_0$ can again be made to traverse the vessel, and will emerge with full energy amplification. The ability of the present invention to operate in a mode in which repetitive pulses are amplified to high energies is important and is reflected in the claims section of the present disclosure.

Careful consideration of all the factors involved is necessary in selecting an active-atom or active-ion species for use in the disclosed invention, which requires that any such species operate on the basis of a Λ-type structure. For example, it might be supposed that the lowest resonance transitions of all the other alkali atoms (i.e. Li, Na, K, and Rb) would be good candidates for dressed-atom-laser transitions in the disclosed invention, since these elements are all isoelectronic with Cs. However, this appears not to be the case for two main reasons. Firstly, these atoms are all much lighter than Cs, and their Doppler-broadened transition linewidths are correspondingly much greater. The Doppler linewidth $\Delta v_D$ effectively enters as the fourth power in the denominator of the formula for the hyper-Raman gain given in Eq. (2). The second reason is more serious. Its basis is the fact that, in the case of the lighter alkalis, the separations between adjacent hyperfine levels of the excited $^2P_{1/2,3/2}$ states are generally smaller than the Doppler widths $\Delta v_D$. There are always present dipole-allowed transitions originating from one or both of the two low-lying levels (in this case $^2S_{1/2}$ hyperfine levels) of a possible dressed-atom Λ structure and terminating on $^2P_{1/2,3/2}$ hyperfine levels other than the designated upper level of the Λ-type dressed-atom structure. In the case of the lighter alkalis, one or more of these non-participating transitions will spectrally overlap one of the dressed-atom transitions, effectively producing strong linear loss at the frequency of the latter. This effect even appears to rule out use of the Cs $6S_{1/2} \leftrightarrow 6P_{3/2}$ transition in the disclosed invention. In the $6P_{3/2}$ state the energy separation between F'=2 and F'=3 is ≈151 MHz, while that between F'=3 and F'=4 is ≈201 MHz. Both separations are less than the Doppler width $\Delta v_D \approx 500$ MHz. However, the separation between the two $6P_{1/2}$ hyperfine levels, $\approx 1172$ MHz (FIG. 4), is large enough to allow the disclosed invention to operate. The absorption constant of a Doppler-broadened line is:

$$k_v = k_o \exp\left\{-\left[\frac{2(v-v_o)}{\Delta v_D}\sqrt{\ln 2}\right]^2\right\}. \quad (4)$$

Hence the absorption coefficient at any $6S_{1/2} \leftrightarrow 6P_{1/2}$ dressed-atom laser frequency arising from a non-participating transition having a maximum absorption coefficient $k_o$ would be only $\approx 2 \times 10^{-7}\ k_o$.

A neutral atomic species having J=0 in the ground electronic state, and having no nearby other levels with J=1 or 2 would not be a suitable candidate for an active-atom species in the disclosed invention, if it is desired that the lowest level in a Λ dressed-atom-laser scheme be the J=0 ground electronic state of the atom, the reason being that no hyperfine splitting exists in the latter state. This, for example, would rule out participation of either of the Hg-atom transitions at 1849.5 Å or 2536.6 Å in simple Λ-type dressed-atom-laser schemes. On the other hand, some atoms having J=0 in the ground electronic state possess excited metastable levels which can become significantly populated in a gaseous discharge and which in principle should be utilizable in Λ-type dressed-atom-laser schemes. The same element Hg provides an example. The lowest excited state of Hg, the $6p^3P_0$, is metastable, but is radiatively coupled to the higher-lying $7s^3S_1$ state via the dipole-allowed transition at 4046.6 Å. The latter state, in turn, is radiatively coupled to the $6p^3P_2$ state via the dipole-allowed transition at 5460.7 Å. Since the $6p^3P_2$ is also relatively metastable, and since a low-pressure Hg discharge strongly fluoresces at both 4046.6 Å and 5460.7 Å, use of these three levels could perhaps constitute the basis for a workable Λ-type dressed-atom laser, although the two frequencies $v_o$ and $v'_o$ here would not be as close together as one might like for optimum EIT to occur.

While the ground electronic states of all the rare gases have J=0, the first excited states (except in the case of He) have J=2, and are therefore metastable. Hyperfine splittings would exist in these J=2 metastable states for those rare gas isotopes having odd mass numbers, making the latter possible candidates for Λ-type dressed-atom lasers. In all rare gases (again aside from He), the third excited electronic states have J=0 and are also metastable. Use of these J=0 states, together with the aforementioned J=2 metastable first excited states, as the lower levels in Λ-type dressed-atom-laser schemes can therefore also be considered.

Figure 5:
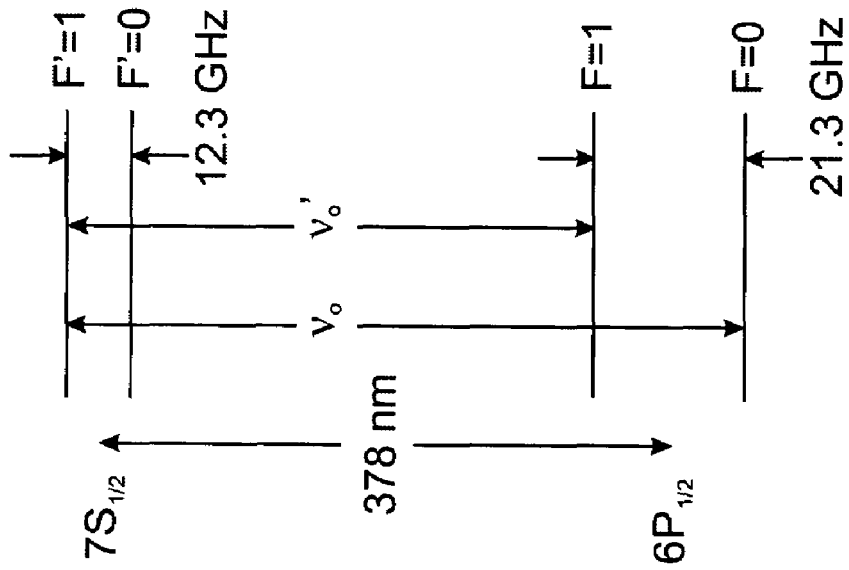
FIG. 5 shows the hyperfine energy levels within the 377.6-nm $6P_{1/2} \leftrightarrow 7S_{1/2}$ transition in $^{205}$Tl. Level shifts are not to scale.

Examples of elements whose neutral atoms have level structures that would allow participation of their ground electronic states in Λ-type, dressed-atom-laser schemes are Tl, Bi, and Pb. FIG. 5 shows that the energy splittings involved in the hyperfine components comprised by the $6P_{1/2} \leftrightarrow 7S_{1/2}$ transition of either $^{203}$Tl or $^{205}$Tl (only the latter is shown) would be optimum for a Λ-type structure in a dressed-atom laser.

Often ions of neutral elements possessing level structures that make their ground states unusable in Λ-type dressed-atom-laser schemes have level structures that would allow dressed-atom-laser amplification in such schemes. Such is the case, for example, with the $6S_{1/2} \leftrightarrow 6P_{1/2}$ transition of singly ionized Hg. For odd isotopes of this element (e.g. $^{199}$Hg or $^{201}$Hg), the ground electronic state of this ion is split into two levels by the hyperfine interaction, which would thus allow these levels to function as the two lower levels in a Λ-type dressed-atom-laser gain medium operating at $\cong 1942$ Å. Another workable dressed-atom-laser system would utilize singly ionized Xe. Here again the ground state level is split by the hyperfine interaction in the case of the odd isotopes. Although its experimental realization is technically challenging, an Xe$^+$ dressed-atom-laser gain medium provides the basis for an intense, highly monochromatic, CW or pulsed, coherent light source emitting at $\cong 1100$ Å. Both the Hg$^+$ and Xe$^+$ dressed-atom gain media effectively operate at room temperature. This, together with the fact that both ions are relatively heavy, combine to make the Doppler width $\Delta v_D$ relatively narrow in each of these systems, an important advantage in attaining maximum amplifier gain, as was explained earlier in the present section of the disclosure. In evaluating potential dressed-atom-laser systems, one should bear in mind that in electrical discharges it is often easier to generate high densities of singly ionized atoms in their ground electronic states than it is to generate high densities of neutrals in metastable excited states.

Figure 6:
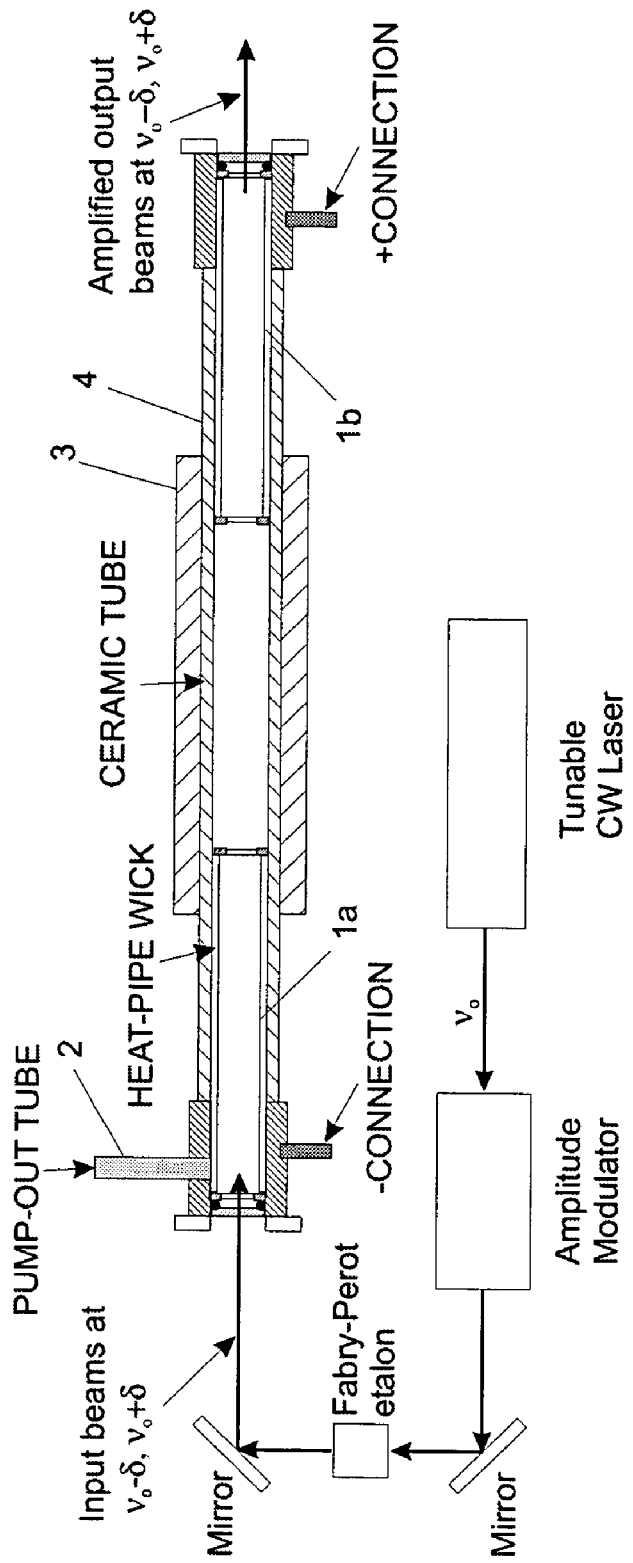
FIG. 6 is a schematic diagram of apparatus embodying the disclosed invention when the latter is operated in its simplest (CW) "amplifier" configuration, i.e. with electrical discharge and dressed-atom amplification processes occurring in spatially overlapping regions within the same gas-discharge-containing vessel. The vessel is here represented as a heat-pipe discharge tube (HPDT) having a longitudinal discharge. The upper and lower sidebands of an amplitude-modulated, single-frequency, CW laser beam provide the two required monochromatic input beams. Remaining light at the unmodulated laser frequency is blocked by the Fabry-Perot etalon shown inserted in the optical path.

In the remainder of the present section, typical embodiments of the invention are discussed. FIG. 6 is a schematic diagram of apparatus embodying the disclosed invention when it is desired that the latter operate as a single-pass CW amplifier in a configuration in which there is spatial overlap between the regions in which the gaseous electrical discharge and dressed-atom-laser amplification occur.

In FIG. 6, the gas-containing vessel is represented to be a heat-pipe discharge tube (HPDT). Details of construction and principles of operation of HPDTs are discussed in Sorokin & Lankard, *Journal of Chemical Physics* 55, 38 (1971) and also in U.S. Pat. No. 3,654,567 by R. T. Hodgson. In brief, an HPDT provides a simple and effective way both to contain a constant-density column of a hot metallic vapor (such as Cs or Tl) and, at the same time, maintain a uniform, continous electrical discharge along a large fraction of the length of such a column. The heat-pipe action occurring along the lengths of the two metal mesh wicks 1*a* and 1*b* (typically made of stainless steel) placed at each end of the vessel forces a compact cushion of inert buffer gas (typically He) to form adjacent to each end window, leaving a large isothermal column of pure metal vapor extending throughout most of the vessel, with the temperature of the vapor actually being determined by the pressure in the buffer gas cushions. The latter effectively prevent metal vapor from condensing on the windows.

For some applications it may be desired to have buffer gas present throughout the vessel, and this can be simply accomplished through use of a buffer gas pressure that exceeds the maximum metal vapor pressure attainable for a given power input to the heater elements contained within the insulated heating jacket 3. One adjusts the buffer gas pressure through the pump-out tube 2.

In FIG. 6 the electrical discharge occurs between the two ends of the heat-pipe wicks 1*a* and 1*b* that are nearest the center of the vessel. Because construction of the type of HPDT diagrammed in FIG. 6 is based upon use of a ceramic tube 4, an electrical discharge can be maintained without the occurrence of short-circuiting.

If it is desired that the electrical discharge and dressed-atom amplification occur in regions of space that are entirely separate from one another, and yet that means be provided to enable fluorescent light generated in the former region to irradiate efficiently the latter region, this can also be accomplished, even when the dressed-atom gain medium comprises atoms of hot metallic vapors such as Cs or Tl. One method of doing this would entail use of a different type of HPDT from the one shown in FIG. 6.

Figure 7:
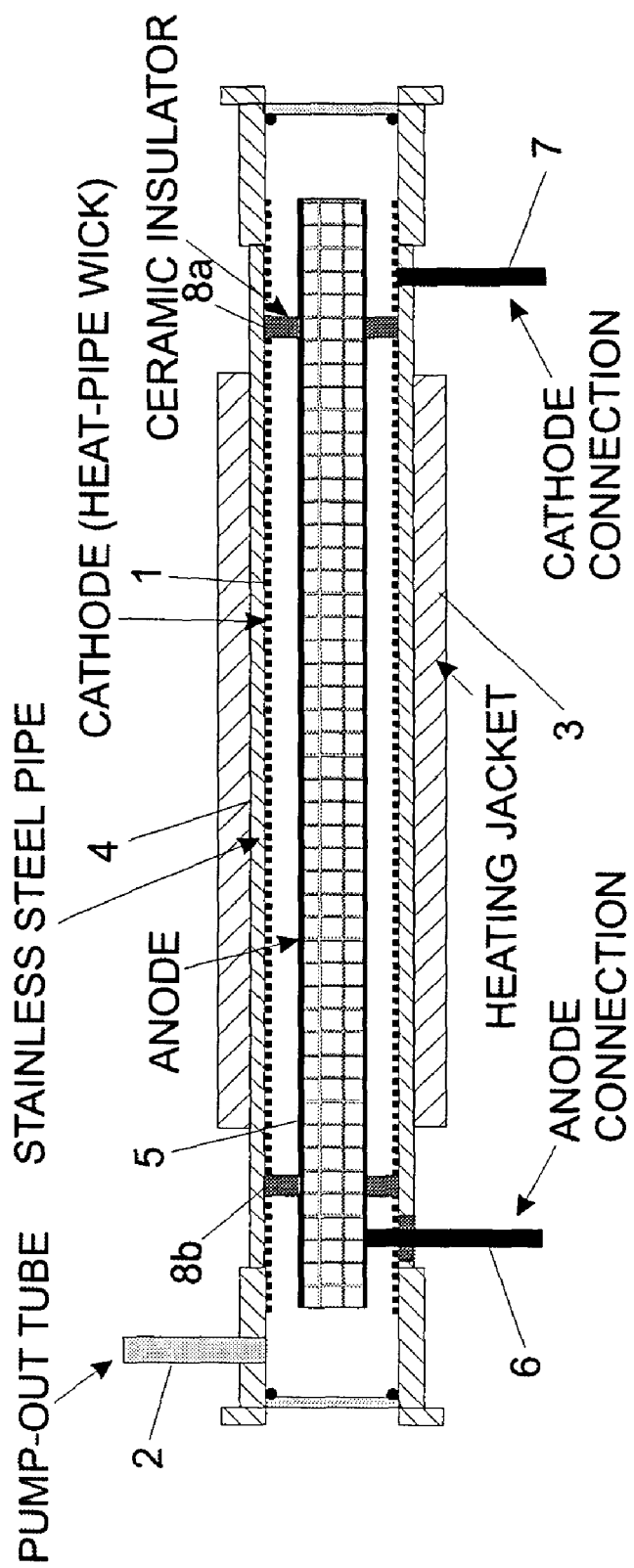
FIG. 7 is a schematic diagram of an alternative type of HPDT which can embody the invention. Here the gaseous electrical discharge occurs transversely, in a manner that allows the discharge region to be separate from the region in which amplification occurs. The propagation of fluorescence photons produced in the former region into the latter region is mediated by the processes of elastic scattering and diffusion.

In FIG. 7 such a suitable alternative HPDT is diagrammed. Construction of such a device would involve slight modification of a conventional heat-pipe oven (HPO). Within the thick stainless steel pipe 4 that both contains the gas and provides structural support in an HPO, one would coaxially position and affix with non-conducting supports 8a and 8b a long, thin (however, rigid), stainless steel tubular screen 5, one having a diameter typically less than half that of the thick pipe 4 and a length that is approximately the same. This tubular screen 5 would form the anode for the electrical discharge. A roll of stainless steel mesh 1, pressed against the inner diameter of the thick stainless steel pipe 4, and continuously extending along most of the length of the latter, would both form the cathode and provide a wick, enabling heat-pipe action to occur in the alternative HPDT device. The electrical discharge would thus here occur transversely and be confined to the region between the two electrodes. Through the open screened structure of the tubular screen anode 5, the (e.g. Cs, Tl) fluorescence produced via EIE in the region of the discharge would efficiently irradiate the (e.g. Cs, Tl) atoms in the region in which dressed-atom amplification occurs in the vessel.

In the successful experiment reported in Merriam et al. (1999), an HPO (not an HPDT, because no electrical discharge was present) was used to contain the hot Pb vapor used as the nonlinear mixing medium.

FIG. 6 also illustrates how one can provide the two monochromatic input laser beams tuned exactly to the bare-atom resonance frequencies that, in the apparatus of the present invention, are required to both "dress" the active atoms in the gas and "prime" the SHRS process to add more photons to the beams. In FIG. 6, it is assumed that CW operation occurs. For the single-pass amplifier configuration shown in this figure, the two input beams must be continually present whenever it is desired that greatly amplified monochromatic coherent light beams at exactly the same two frequencies emerge from the output window of the HPDT. The term "seed beams" therefore aptly describes the two input beams required in embodiments of the present invention that are similar to the one shown in FIG. 6.

As indicated in FIG. 6, both input laser beams can be conveniently generated through amplitude modulation of a single-frequency laser beam. One would modulate the latter at half the frequency corresponding to the ground state hyperfine splitting. For definiteness, it will now be assumed that dressed-atom amplification in FIG. 6 occurs on the Cs transitions shown in FIG. 4. The single-frequency laser beam should thus be amplitude modulated at a frequency of about (9192.6)/2=4596.3 MHz. The upper and lower frequency sidebands of the modulated beam would then be separated in frequency by the correct amount. To eliminate any possible deleterious interference effects arising from the continuing presence after the modulator of a strong beam at the original unmodulated laser frequency, the latter can be completely blocked by insertion of a tuned Fabry-Perot etalon in the optical path after the modulator. This is shown in the diagram.

An example of a commercially available laser that can more-than-adequately serve as the single-frequency CW laser in FIG. 6 is the MBR-PS Ring Laser manufactured by Coherent, Inc. This laser provides a very monochromatic (<20 MHz linewidth) CW output beam that is widely tunable about 894 nm and produces an output power of more than 1 W throughout its whole spectral range of tuning. Assuming a 10 percent energy conversion into each of the two sidebands generated by the action of the modulator, this would mean that roughly 100 mW powers would be available for each of the two input beams. In order to satisfy the requirement that $\Omega_1 > \gamma, \gamma'$—so that the Cs atoms become coherently phased—input beam intensities falling at the low end of the range 10–100 mW/cm$^2$ would be sufficient. Thus a power of 100 mW existing in each of the two sidebands created by the action of the modulator in FIG. 6 would provide input beams fully capable of dressing the Cs atoms in the invention.

The method of generation of the two required input beams shown in FIG. 6 produces sufficiently intense beams having approximately equal intensities. As earlier shown in the present section of the disclosure, this would represent an optimum condition for dressed-atom amplification to occur in the present invention, for it would both guarantee that, at least at the start of amplification, the intensities of the dressed-atom absorption bands symmetrically offset from $\omega_0$ and $\omega'_0$ would remain constant in strength as $\Omega_1$ increases, and also that all four of these bands would have roughly comparable absorption strengths. There is a strong feedback mechanism inherent in the gain mechanism of the disclosed invention which acts both to establish and maintain this optimum condition during the entire time the light from each input beam propagates through the gain medium and becomes amplified. Simply explained, if one of the two beams were somehow to get much stronger than the other, the two dressed-atom absorption bands symmetrically offset from the frequency of the former would automatically become weaker, while those symmetrically offset from the frequency of the latter would correspondingly get stronger. Since the SHRS gain coefficient at each dressed-atom frequency varies with the cubed strength of the associated dressed-atom absorption bands (i.e. with the sixth power of the transition dipole moment—see Eq. (2)), the source of the above mentioned feedback is evident. Such a strong, naturally present, tendency for self optimization in the amplification process to occur is a unique property of the gain medium of the disclosed invention, one that is not present in gain media based upon population inversions.

With requirements for the two input laser beams satisfied in the manner discussed above, one could expect CW output beam powers as high as ~W/cm$^2$ from a discharge-pumped, Cs dressed-atom, coherent light amplifier having parameter values similar to those assumed in the gain calculation performed earlier in the present section of the disclosure. One recognizes that the ~1 W/cm$^2$ output intensity value here estimated simply represents the maximum total fluorescence pump power that can be generated via EIE about both $\omega_0$ and $\omega'_0$ over the entire length of the discharge, which has here been assumed to be 1 meter long. Although the optical gain is strongly saturated, it is really the limited supply of pump power that causes the saturation, not a reduction in the intrinsic efficiency of the SHRS conversion process. If CW powers much greater than 1 W/cm$^2$ are required, one could, for example, cascade together a string of increasingly sized HPDT amplifiers. As was noted in the SUMMARY OF THE INVENTION section, the gain medium of the disclosed invention offers a significant technical advantage in stacking together a large number of amplifier modules, since it is not necessary to insert any optical isolators, saturable absorbers, etc. between any of the modules to prevent amplified spontaneous emission from occurring.

Because the amplifier module shown in FIG. 6 displays high nonlinear gain at both input laser beam frequencies, it is apparent that in principle it could also be configured to work as an oscillator. To realize the latter type of device, one would simply incorporate the HPDT of FIG. 6 into a standard laser optical cavity, positioning a partially transparent reflective mirror outside each window of the HPDT and along the axis of the latter, and then aligning the two reflective mirrors to be parallel to one another. However, when configured as an "oscillator", the present invention must still provide for auxiliary lasers to produce monochromatic beams at $\omega_0$ and $\omega'_0$ which are required to "start" the dressed-atom laser. These "starter" laser beams would be collinearly directed into the dressed-atom laser cavity through one of its partially transmitting end mirrors and aligned so as to overlap strongly with the lowest order laser cavity modes which are excited when dressed-atom laser action occurs. Precisely tuned "starter" laser beams at both $\omega_0$ and $\omega'_0$ are required. Such beams can be produced on a CW basis with use of the same technique suggested above for generating the "seed" beams (i.e. input laser beams) in the case of FIG. 6. Once the dressed-atom oscillator turns on, the "starter" laser beams can be turned off, or otherwise removed from the apparatus entirely, and the dressed-atom laser will continue to operate for an indefinitely long period of time, producing high power CW beams of extremely monochromatic coherent light at the two bare-atom resonance frequencies. Carefully tuned pulsed laser beams can also satisfactorily function as "starter" beams. However, the duration of the individual pulses has to be at least 100 nsec long.

The CW output beams produced with the device of the disclosed invention, operating as either "amplifier" or "oscillator", can also be used to "seed" or to "start" another such device that utilizes the same active atom (ion) species. This suggests an interesting, possibly important, practical application for the disclosed invention. It could provide the basis for an easily constructed and readily maintained distribution network of high power CW laser beams in a large manufacturing site in which such beams are utilized for material processing. The high CW optical power required for an individual processing tool could for example be provided by a local Cs dressed-atom amplifier or oscillator, with light of much lower power taken from the network used to "seed" or "start" each such device as needed. It is again a unique feature of the disclosed invention that no isolators, saturable absorbers, etc. would have to be inserted between any of the components of such a network.

We claim:

1. An apparatus for amplifying two collinearly propagating beams of monochromatic coherent radiation at optical frequencies $v_0$ and $v'_0$, comprising:
   a vessel for containing a gas and maintaining an excitation in the gas volume;
   wherein intense narrow-band fluorescence is emitted from said excitation at frequencies $v_0$ and $v_0'$ of allowed optical transitions of constituents of the gas, wherein said optical transitions share a common upper energy level and form a $\Lambda$ type structure, and wherein one or both lower energy levels are populated in said gas volume, whereby monochromatic laser beams at frequencies $v_0$ and $v_0'$ propagating collinearly through said gas volume containing vessel nonlinearly convert photons from said fluorescence 11 into photons of said propagating beams, thus amplifying said beams.

2. The apparatus of claim 1, further comprising:
   means for producing monochromatic laser beams at frequencies $v_0$ and $v_0'$.

3. The apparatus of claim 2, wherein the monochromatic laser beams at frequencies $v_0$ and $v_0'$ are continuous (CW) laser beams.

4. The apparatus of claim 2, wherein the monochromatic laser beams at frequencies $v_0$ and $v_0'$ are pulsed laser beams.

5. The apparatus of claim 2, wherein the monochromatic laser beams at frequencies $v_0$ and $v_0'$ are laser beams are each a continuous series of Q-switched pulses.

6. The apparatus of claim 2, wherein the monochromatic laser beams at frequencies $v_0$ and $v_0'$ are laser beams are each a continuous series of mode-locked-pulses.

7. The apparatus of claim 6, wherein the monochromatic laser beams at frequencies $v_0$ and $v_0'$ are laser beams are each a continuous series of femtosecond pulses.

8. The apparatus of claim 2, further comprising:
   reflective mirrors forming a optical cavity about the gas volume containing vessel; and
   means for directing said beams to propagate collinearly in said optical laser cavity for the time required for amplification of light at frequencies $v_0$ and $v_0'$.

9. The apparatus of claim 1, further comprising:
   reflective mirrors forming a optical cavity about said gas volume containing vessel, wherein light at frequencies $v_0$ and $v_0'$ is amplified.

10. The apparatus of claim 1, wherein continuous and efficient conversion of photons of fluorescence into photons of coherent light beams at frequencies $v_0$ and $v_0'$ occurs by the nonlinear process of stimulated hyper-Raman scattering (SHRS) occurring at every point within said gas volume containing vessel wherin both said emitted fluorescence and said two collinearly propagating beams of monochromatic coherent radiation are present.

11. The apparatus of claim 1, wherein three specified-species levels forming a $\Lambda$-type structure with resonance frequencies at $v_0$ and $v_0'$ are both hyperfine levels of the Cs $6S_{1/2}$ ground electronic state and one hyperfine level of the Cs $6P_{1/2}$ excited electronic state.

12. The apparatus of claim 1, wherein three specified-species levels forming a $\Lambda$-type structure with resonance frequencies at $v_0$ and $v_0'$ are both hyperfine levels of the $6P_{1/2}$ ground electronic state of $^{203}$Tl and the F'=1 hyperfine level of the $7S_{1/2}$ excited electronic state.

13. The apparatus of claim 1, wherein three specified-species levels forming a $\Lambda$-type structure with resonance frequencies at $v_0$ and $v_0'$ are both hyperfine levels of the $6S_{1/2}$ ground electronic state of either singly ionized $^{199}$Hg or $^{201}$Hg and a hyperfine level of the $6P_{1/2}$ excited electronic state that is coupled by dipole-allowed transitions to both said lower levels.

14. The apparatus of claim 1, wherein three specified-species levels forming a $\Lambda$-type structure with resonance frequencies at $v_0$ and $v_0'$ are two hyperfine levels of the $5P_{3/2}$ ground electronic state of any singly ionized odd isotope of Xe and one hyperfine level of the $5S_{1/2}$ excited electronic state that is coupled by dipole-allowed transitions to both lower levels.

15. The apparatus of claim 1, further comprising a plurality of gas volume containing vessels wherein each vessel is a source emitting two output beams of highly monochromatic coherent radiation at frequencies $v_0$ and $v_0'$.

16. The apparatus of claim 15, wherein the output beams of each of the plurality of gas volume containing vessels are arranged as an array and directed to point in the same direction, and wherein the phase of each bean is varied to form a phased directional array.

17. The apparatus of claim 16, further comprising a cascaded series of increasingly sized gas volume containing vessels for each beam, wherein the output of each of the plurality of sources is directed into a cascade of increasingly sized gas volume containing vessels.

18. The apparatus of claim 1, further comprising a cascaded series of increasingly sized gas volume containing vessels, wherein the amplified light at frequencies $v_0$ and $v_0'$ is amplified in the cascade of increasingly sized gas volume containing vessels.

19. The apparatus of claim 1, wherein said gas volume containing vessel is a heat pipe discharge tube (HPDT).

* * * * *